Sept. 12, 1961   C. CHALICH   2,999,604
APPARATUS FOR TRANSFERRING ARTICLES
Filed Nov. 13, 1957   6 Sheets-Sheet 4
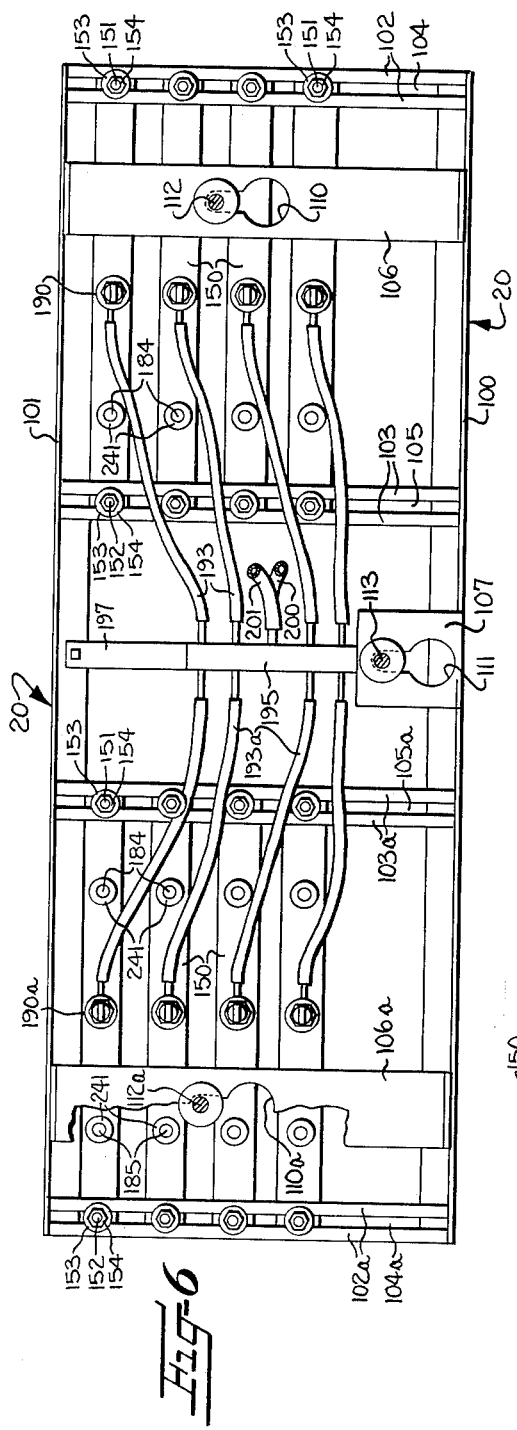
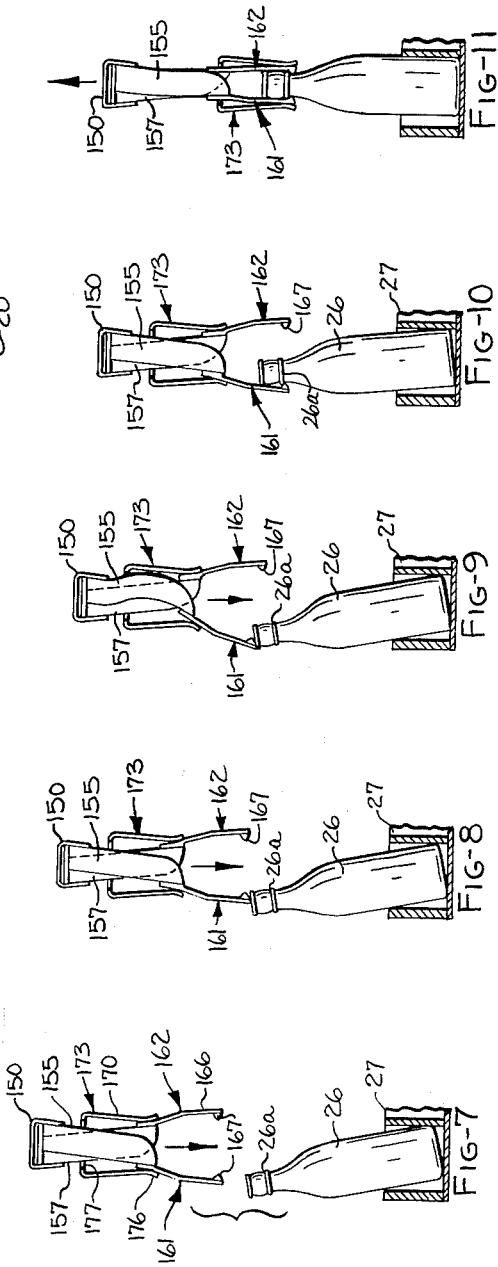
INVENTOR,
CHARLES CHALICH
BY Eaton, Bell, Hunt & Seltzer
ATTORNEYS

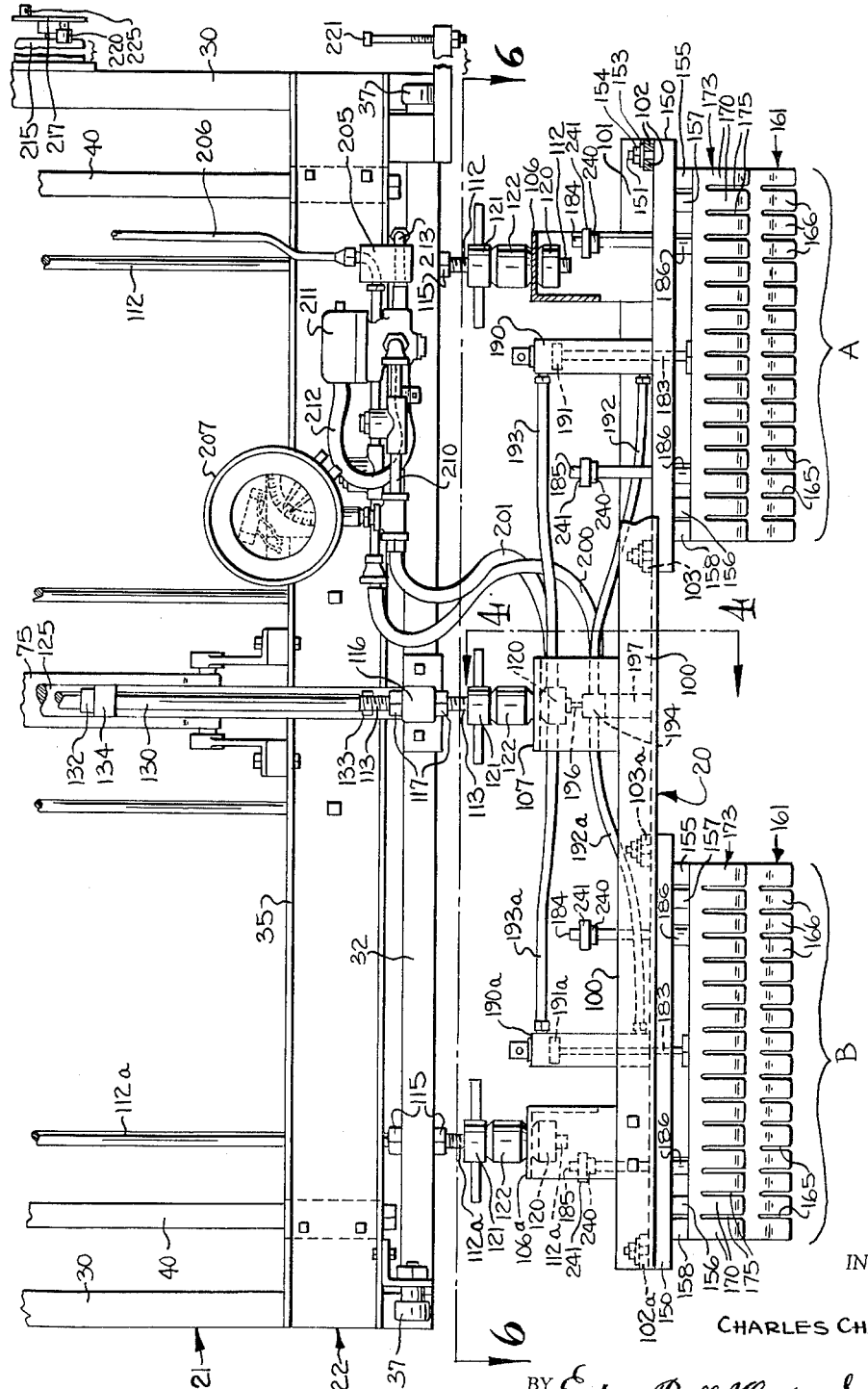

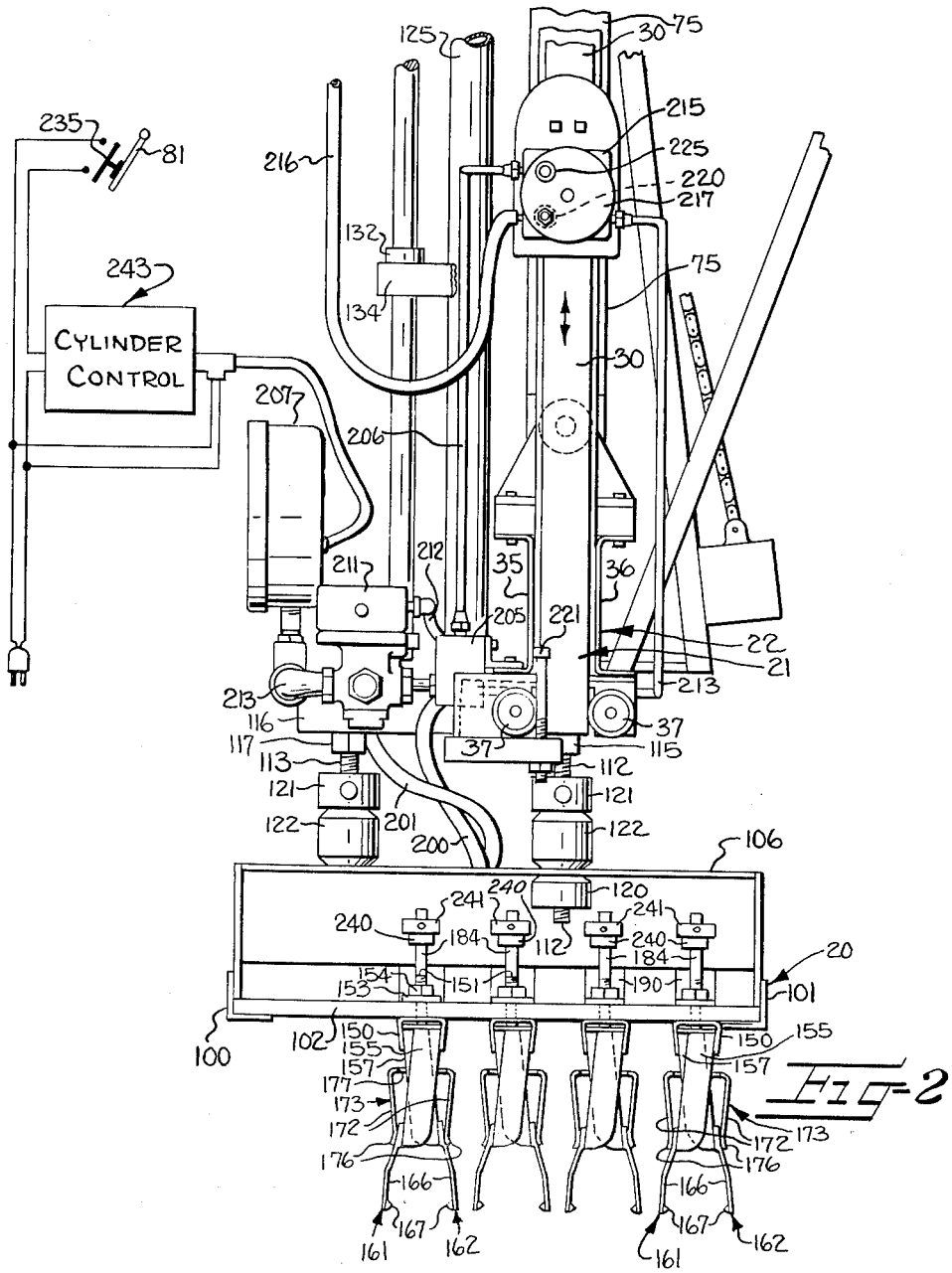

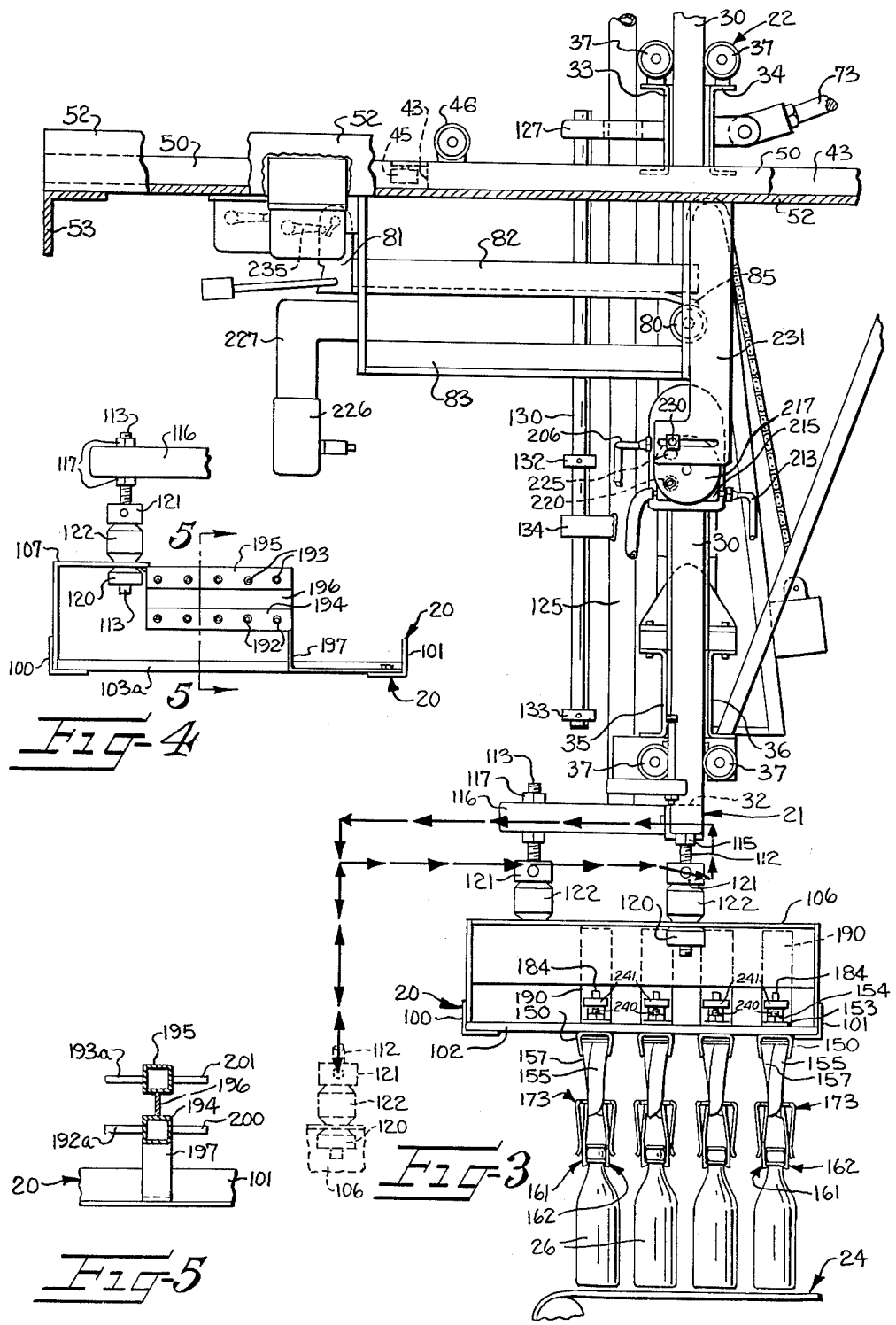

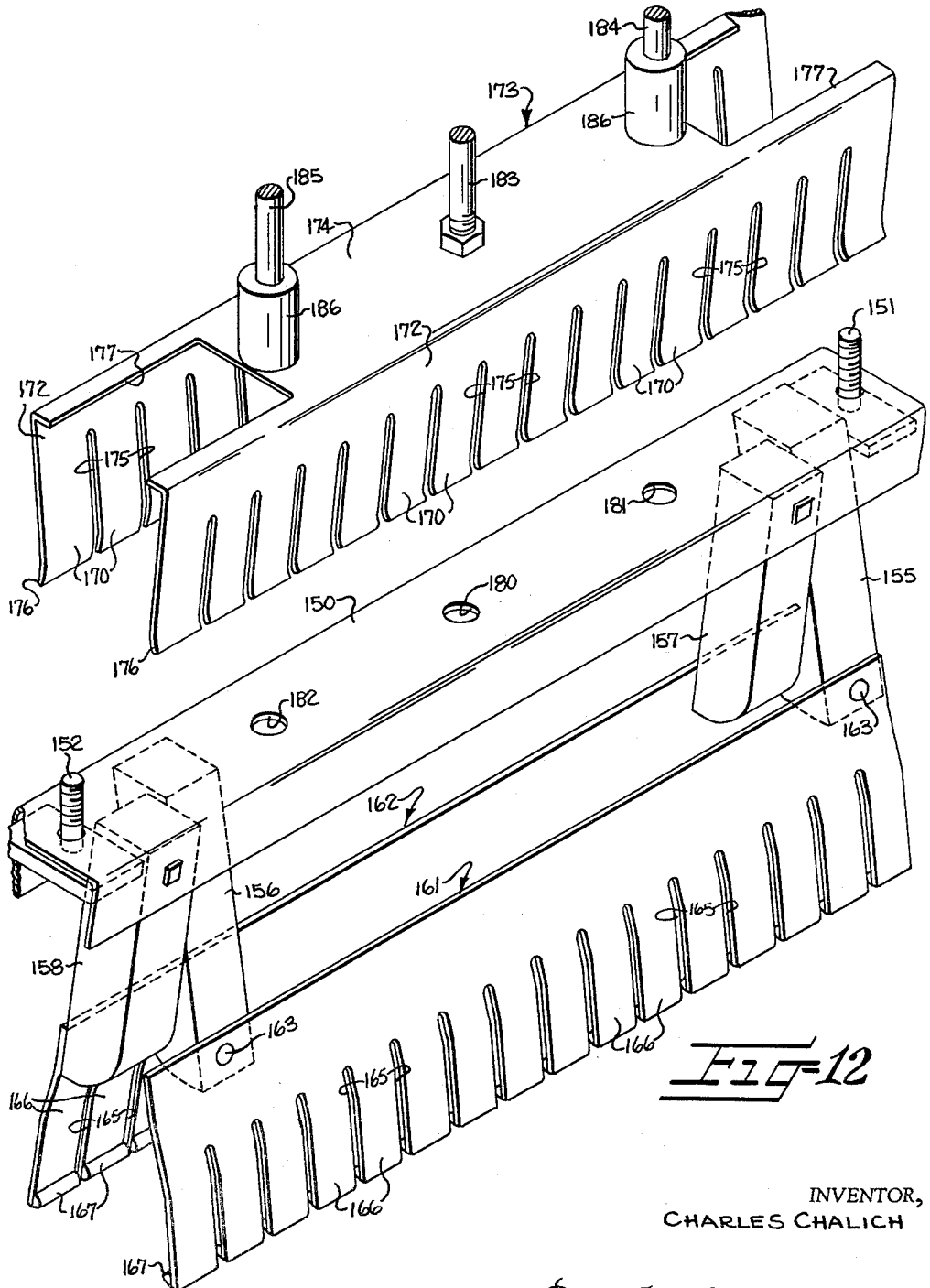

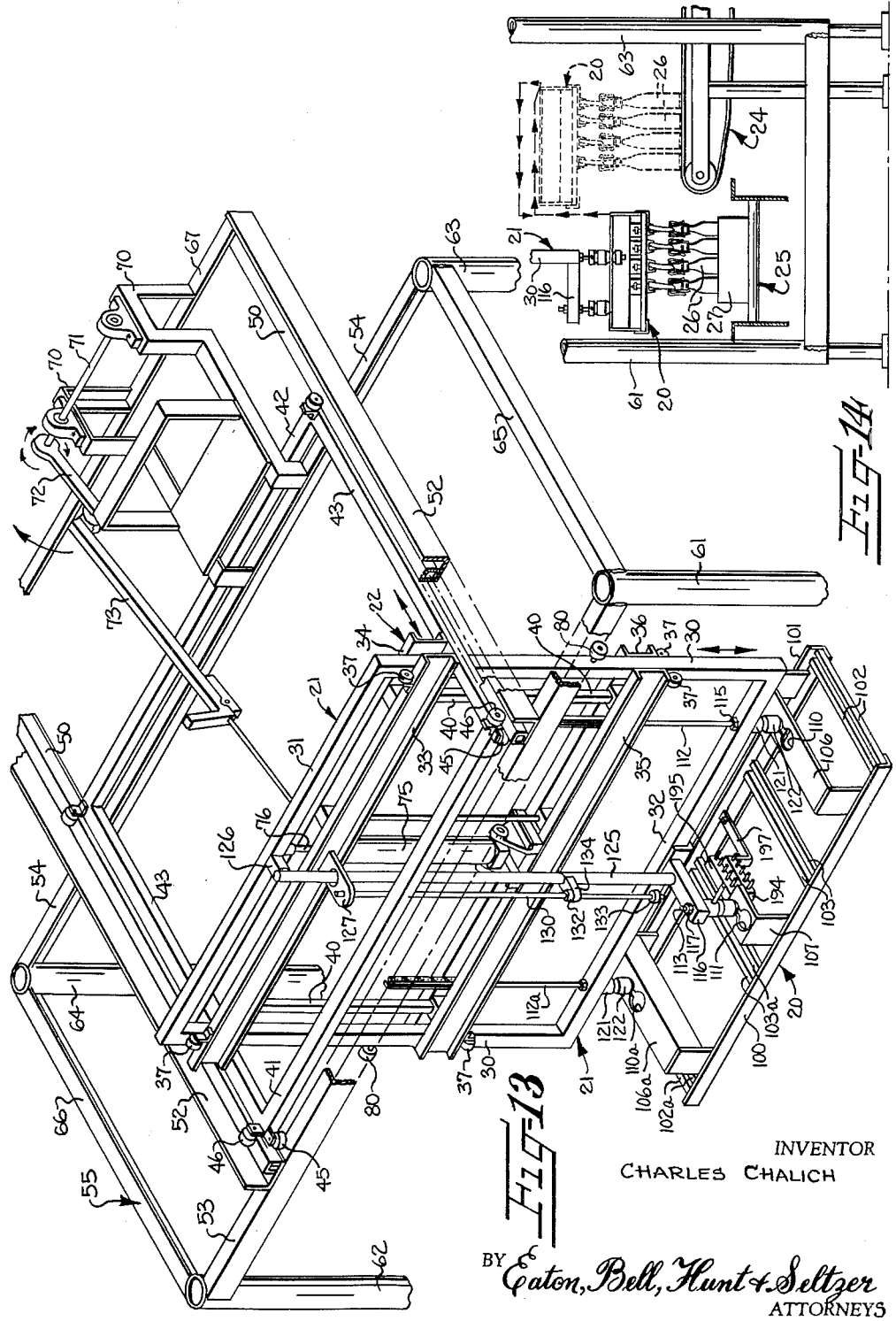

United States Patent Office 2,999,604
Patented Sept. 12, 1961

2,999,604
APPARATUS FOR TRANSFERRING ARTICLES
Charles Chalich, Salisbury, N.C., assignor to Taylor Manufacturing Company, Inc., Salisbury, N.C., a corporation of North Carolina
Filed Nov. 13, 1957, Ser. No. 696,087
15 Claims. (Cl. 214—1)

This invention relates to article transferring apparatus of the character used for transferring groups of articles, such as bottles, cans and the like, from one place to another. More especially, this invention relates to improved means for releasably engaging articles to be transferred.

It is an object of this invention to provide an article transferring apparatus which includes oppositely outwardly biased gripper elements which, when moved into article engaging position, are engaged at their distal or outer surfaces by similar clamping elements for yieldably pressing the gripper elements into engagement with corresponding articles, whereby the articles may be lifted and transferred to another point, and including means for withdrawing the clamping elements relative to the gripper elements for releasing articles from the gripper elements.

Another object of the invention is to provide apparatus of the character described in which the gripper elements are so suspended from a support frame that each gripper element normally extends at an angle to the article to be contacted thereby so as to engage and move outwardly in engagement with and relative to the upper end of any article which may be misalined so as to automatically aline therewith the articles to be transferred.

It is still another object of this invention to provide apparatus of the general character described which is simply constructed and manufactured, highly efficient, and which lends itself to mass production.

This application is a continuation-in-part of my copending application, Serial No. 573,489, filed March 23, 1956, and entitled Means to Transfer Articles from Cases to a Conveyor, now U.S. Patent 2,862,634, issued December 2, 1958.

Some of the objects of the invention having been stated, other objects will appear as the description proceeds when taken in connection with the accompanying drawings, in which—

FIGURE 1 is a front elevation of a portion of a machine showing the improved article transferring apparatus in association therewith, with the gripper elements in operative or open position;

FIGURE 2 is an enlarged fragmentary elevation looking at the right hand side of FIGURE 1;

FIGURE 3 is a view similar to FIGURE 2 showing the article gripping devices in article-engaging position preparatory to releasing articles therefrom, this being a view similar to FIGURE 2, but showing additional portions of the machine on a higher level than that shown in FIGURE 2;

FIGURE 4 is a vertical sectional view taken substantially along line 4—4 in FIGURE 1;

FIGURE 5 is an enlarged fragmentary vertical sectional view taken substantially along line 5—5 in FIGURE 4;

FIGURE 6 is a top plan view, partially in section and partially broken away, taken substantially along line 6—6 in FIGURE 1;

FIGURES 7 through 11 are schematic illustrations of one of the bottle or article-engaging units shown in the lower portion of FIGURE 2, showing progressive steps in the operation thereof for automatically alining any misalined articles or bottles therewith as they grip the same;

FIGURE 12 is a partially exploded isometric view of one of the article-engaging units, with portions thereof broken away and shown in section;

FIGURE 13 is a schematic isometric view of the framework for supporting the carriage from which the improved article-engaging units are suspended and illustrating means for imparting movements to the carriage in substantially the path shown in broken lines in FIGURES 3 and 14;

FIGURE 14 is a fragmentary view of one side of the lower portion of the machine, showing the relationship of the article-engaging devices in pick-up and depositing positions.

In general, the machine disclosed in the present drawing is constructed in substantially the same manner as that disclosed in said copending application Serial No. 573,489, but is modified to accommodate the improved article-transferring apparatus. The machine disclosed in said copending application is provided with a carriage from which article-engaging or article-grasping members are suspended, and means are provided for lowering the carriage to article-engaging position, then raising the same, moving the same rearwardly or to one side of its original plane of vertical movement, then releasing the articles as it again moves upwardly, and then reversing the direction of movement of the carriage to return the same to its original position preparatory to the repeating of another cycle in its movement.

The article-transferring apparatus of the present invention is suspended from a carrier head or frame peculiar to the present invention and the carrier is supported and operated in a manner substantially the same as that disclosed in said copending application. Therefore, only so much of the machine and related elements will be described as is necessary to a clear understanding of the present invention.

Referring more specifically to the drawings, the numeral 20 broadly designates the novel carrier head or frame from which depend longitudinally spaced groups of article-engaging units or devices, there being two such groups in this instance, indicated as A and B in FIGURE 1. The groups A and B of article-engaging devices represent the nucleus of the present invention and will be later described in detail.

The carrier head 20 is secured to the lower end of an upright, substantially rectangular, vertically and horizontally movable primary or main carriage broadly designated at 21. The primary carriage 21 is supported for vertical movement in a secondary or horizontally movable carriage broadly designated at 22. The groups of article-engaging devices A, B, the carrier head 20 and the two carriages 21, 22 are, at times, disposed outwardly or forwardly of a driven discharge conveyor broadly designated at 24 and above a platform 25 which may be in the form of a case-positioner of substantially the type disclosed in said copending application Serial No. 573,489. Solely by way of example, the articles to be engaged are illustrated as bottles 26, which may be positioned upon the platform 25 in cases or containers 27 so as to be removed from the cases and placed upon the conveyor 24 (FIGURES 3 and 14).

The improved carrier head 20 and its groups of article-engaging devices A, B may be used with many different types of machines and the machine with which they are associated in the present drawings is illustrated primarily for the purpose of providing an adequate description of a preferred manner of mounting the carrier head and to illustrate a preferred means for controlling the operation of the article-engaging devices. The primary carriage 21 comprises a pair of spaced upright side-frame members 30 and upper and lower substantially horizontal cross-frame members 31, 32 (FIGURE 13). The upright side-frame members 30 of the vertically movable frame or carriage 21 are guided for vertical movement between upper and lower pairs of transverse frame members 33, 34, 35, and 36 by means of guide rollers 37 carried by the upper and lower transverse frame members 33—36. The frame members 33—36 are parts of the secondary carriage 22.

The upper frame members 33, 34 are connected to the lower frame members 35, 36 by suitable upright posts 40. The upper part of the secondary carriage 22 is substantially rectangular in plan and includes front and rear transverse frame members 41, 42 and side frame members 43. Opposite ends of the upper transverse frame members 33, 34 are suitably secured to the side frame members 43. The upper part of the secondary carriage 22 is provided with a plurality of rollers thereon, there being two of these rollers indicated at 45, 46, adjacent each corner of the rectangular upper part of the secondary carriage.

The rollers 45 engage proximal surfaces of stationary tracks 50 and the rollers 46 rest upon the tracks 50 for guiding the secondary carriage during substantially horizontal movement thereof. The tracks 50 are carried by respective frame members 52 suitably secured to the upper surfaces of front and rear stationary frame members 53, 54 of a main frame broadly designated at 55. Opposite ends of the frame members 53, 54 are fixed to columns or posts 61, 62 and 63, 64. Upper ends of the posts or columns 61, 63 and 62, 64 are bridged by respective frame members 65, 66.

The frame members 52 extend rearwardly of the frame member 54 and are bridged by a frame member 67. The frame members 54, 67 support a pair of brackets 70 on which an intermittently driven shaft 71 is journaled. The shaft 71 is intermittently driven by means, not shown in the present drawings but being clearly shown in said copending application, to cause the secondary carriage to move rearwardly a predetermined distance and then move forwardly to its original position each time the main or primary carriage moves upwardly from a lowered position. Since the manner in which the shaft 71 is driven and controlled is clearly disclosed in said copending application, a further disclosure thereof in the present application is deemed unnecessary.

The shaft 71 has a crank 72 fixed thereon, to which one end of a telescoping link 73 is pivotally connected, the forward end of the link 73 being pivotally connected to the transverse frame member 34 (FIGURE 3) of the secondary carriage 22.

The primary carriage 21 is raised and lowered by motive means in the form of a fluid-pressure-operated ram comprising a main cylinder 75 which is suitably supported on the lower transverse frame member 35, 36 and which has a piston rod 76 extending upwardly therefrom and being connected to the upper transverse frame member 31 of the vertically movable primary carriage 21. The flow of fluid pressure into upper and lower ends of the cylinder 75, in alternation, may be effected in identically the manner disclosed in said copending application and, accordingly, a further description thereof is deemed unnecessary.

As disclosed in said copending application, means are provided whereby, upon each active upward movement of the primary carriage 21, the carriage 21 moves upward a predetermined distance, then moves rearwardly on a given level, and then moves downwardly slightly for depositing articles then carried by the groups of article-engaging devices A, B on the conveyor 24. Carriage 21 then darts upwardly and moves forwardly on a higher level than it did during rearward movement thereof preparatory to a downward stroke again being imparted to the primary carriage 21. To this end, it will be observed in FIGURES 3 and 13 that each of the upright frame members 30 of the primary carriage 21 has an outwardly projecting follower means 80 thereon, which is in the form of a roller, and may also be termed as a guide-track-engaging element.

In the course of upward movement of the primary carriage 21, each of the track-engaging elements 80 engages the lower surface of a corresponding keeper cam or latch 81 pivotally suspended from the respective frame member 52. The motive means embodied in the cylinder 75 and piston rod 76, effects yieldable upward movement to the primary carriage 21 so the track-engaging elements 80 yieldably engage the lower surfaces of the respective keeper cams 81, only one of which is shown in FIGURE 3. In so doing, the rollers 80 then occupy positions in alinement with the lower surfaces of respective primary carriage controlling or guiding tracks 82, each of which extends rearwardly and is fixed to a built-up inverted substantially U-shaped frame member 83 carried by the corresponding forwardly and rearwardly extending frame member 52.

The primary carriage tracks 82 extend in substantially parallel relation to, and overly the upper run of, the discharge conveyor 24. The rear end of each track 82 is provided with a downwardly and rearwardly inclined dipping or swooping cam portion 85 thereon which lowers the rollers 80 and, consequently, the primary carriage 21 in a swooping motion, after the carriages 21, 22 have moved rearwardly sufficiently to where the bottles or other articles 26 then held by the groups of article-engaging devices A, B are all positioned well over the discharge conveyor 24.

It is apparent that the lower rear edge of each of the inclined cam portions 85 is spaced above the conveyor 24 so that the lower surfaces of the bottles or other articles 26 then held by the groups of article-engaging devices A, B will rest lightly against the upper run of the conveyor 24. The rearward stroke of the carriages 21, 22 is such that the rollers 80 move rearwardly beyond the downwardly and rearwardly inclined portions 85 of the tracks 82. Since the rollers 80 and the carriage 21 are biased upwardly under fluid pressure, it is apparent that movement of the rollers 80 beyond the rear ends of the inclined portions 85 of the tracks 82 will permit the rollers 80 to move upwardly with a short, quick stroke to raise the article-engaging devices A, B out of engagement with the bottles 26, the bottles 26 then having been released from the article-engaging devices, as will be later described. The carriages 21, 22 are then caused to move forwardly, in the course of which the rollers 80 move above the respective tracks 82. As the carriages 21, 22 approach the end of each successive forward stroke thereof, the rollers 80 engage the respective keeper whereupon the pressure is automatically released in the fluid pressure motive means which raises the carriage 21 so the carriage 21 then moves downwardly to complete a cycle in its operation. The conveyor 24 is preferably driven at a speed corresponding to the speed at which rearward movement is imparted to the carriages 21, 22.

The parts of the machine described heretofore, with the exception of the briefly described groups of article-engaging devices A, B and the carrier head 20, are substantially the same as corresponding parts of the machine disclosed in said copending application Serial No. 573,489, and it is with such or similar parts that the present invention is particularly adapted to be associated, although not limited thereto.

*Carrier head*

The carrier head 20 is shown in the form of a substantially rectangular frame including front and rear transverse elongated frame members 100, 101 (FIGURES 1, 2, 3, 6 and 13), to which respective front and rear ends of a plurality of pairs of forwardly and rearwardly extending bars 102, 103, 102a and 103a are suitably secured. The bars in each pair are spaced apart to define respective adjustment slots 104, 105, 104a, 105a therebetween (FIGURE 6).

Opposed end portions of the carrier head 20 are provided with respective inverted substantially U-shaped suspension brackets 106, 106a. An angle bracket 107 is also fixed to the central portion of the front elongated frame member 100 of the carrier head 20. In order to facilitate vertical adjustment of the carrier head 20, the brackets 106, 106a, 107 are provided with respective bayonet slots 110, 110a, 111 therein whose reduced portions are normally loosely penetrated by respective threaded shafts 112, 112a, 113. The shafts 112, 112a loosely penetrate the lower horizontal frame member 32 of the primary carriage 21.

Although the shafts 112, 112a may be in the form of bolts, in this instance the shafts 112, 112a also form tie rods which extend between and are connected to the upper and lower horizontal frame members 31, 32 of the primary carriage 21, the shafts 112, 112a extending loosely between the upper and lower pairs of frame members 33, 34 and 35, 36 of the secondary carriage 22. The shafts 112, 112a are held in the lower horizontal frame member 32 of the primary carriage 21 by means of lock nuts 115, there being a pair of the lock nuts 115 mounted on each of the shafts 112, 112a and engaging the upper and lower surfaces of the lower horizontal frame member 32 of the primary carriage 21.

It will be noted that the bayonet slot 111 and the corresponding screw or threaded shaft 113 are disposed forwardly of and out of alinement with the bayonet slots 110, 110a and the respective shafts 112, 112a (FIGURE 6), thus providing a three-point suspension for the carrier head 20. As best shown in FIGURES 1, 3, 4 and 13, the central threaded shaft 113 extends upwardly and penetrates a cantilever bar 116 in which it is secured by means of a pair of lock nuts 117. The cantilever bar 116 extends rearwardly and is suitably secured to the lower horizontal frame member 32 of the primary carriage 21. Each of the threaded shafts 112, 112a, 113 has a pair of spaced lock nuts 120, 121 and a spacing sleeve or collar 122 thereon. The lock nuts 120, 121 and spacing sleeve 122 are each preferably circular and of a diameter such as to loosely pass through the large opening of the corresponding bayonet slot. The lock nuts 120, 121 may be in the form of spanner nuts.

As shown in the drawings, the lock nuts 120 engage the lower surfaces of the corresponding brackets 106, 106a, 107 and secure the brackets against the lower ends of the corresponding spacing sleeves or collars 122. This positions the carrier head 20 so as to accommodate relatively short bottles, for example, and since bottles for carbonated beverages are usually in two standard sizes, the length of the sleeves 122 is such that the brackets 106, 106a, 107 may be positioned between the upper ends of the spacing sleeves and the lock nuts 121 on the corresponding shafts 112, 112a, 113, so the carrier head 20 occupies a relatively higher position with respect to the main or primary carriage 21 for accommodating relatively long or large bottles.

It is apparent that it is merely necessary to loosen each of the nuts slightly, move the carrier head 20 rearwardly to aline the nuts 120, 121 and sleeves 122 with the large openings of the corresponding bayonet slots, and then raise or lower the carrier head 20 relative to the shafts 112, 112a, 113 to position the horizontal portions of the respective brackets 106, 106a, 107 either between the upper ends of the sleeves 122 and the nuts 121 or between the lower ends of the sleeves 122 and the nuts 120, as desired. This facilitates rapid adjustment of the carrier head and the groups of article-engaging devices A, B to accommodate the different lengths of bottles. Fineness of adjustment of the position of the carrier head 20 is effected by adjusting the lock nuts 121 on the respective shafts 112, 112a, 113.

Of course, extent of vertical adjustment of the carrier head 20 relative to the primary carriage 21 is dependent upon the extent to which the primary carriage 21 will move downwardly with each downward stroke thereof and relative to the platform 25 (FIGURE 14). Also the level to which the primary carriage 21 is raised by the piston rod 76 (FIGURE 13), as each follower 80 moves rearwardly beyond the corresponding track 82 (FIGURE 3), should be limited to insure that each follower 80 is subsequently alined for engaging the corresponding keeper or latch 81 in the course of each succeeding forward stroke of the carriage 21, 22.

Thus, it will be observed in FIGURES 2, 3 and 13 that the primary carriage 21 is provided with an upright post or frame member 125 which is disposed forwardly of the front upper and lower horizontal frame members 33, 35 of the secondary carriage 22. The lower end of the post 125 is suitably secured to the cantilever bar 116. The upper end of the post 125 is suitably secured to a projection 126 extending forwardly from a medial portion of the upper horizontal frame 31 of the primary carriage 21.

It will be observed in FIGURE 13 that the post 125 loosely extends through a bracket or plate 127 in which the upper end of a vertically disposed guide rod 130 is suitably secured. The guide rod 130 has a pair of vertically spaced limiting collars or stops 132, 133 adjustably secured thereon and a lug 134, projecting forwardly from a medial portion of the post 125, is loosely penetrated by the guide rod 130 on a level between the collars or stops 132, 133.

Since the cylinder 75 and piston rod 76 impart movement to the vertically movable primary carriage 21 under yieldable pressure, it is apparent that the lug 134 engages the collar 133 to determine the lowermost level to which the primary carriage 21 may be moved and, conversely, engagement of the lug 134 with the upper collar or stop 132 determines the highest level to which the primary carriage 21 may be raised.

*Article-engaging devices*

In the present embodiment of the invention, all of the article-engaging devices in both groups A, B are of identical construction and, therefore, only one of them will be described in detail, and all the elements associated with each of the article-engaging devices in group A will bear the same reference characters while like elements associated with each of the article-engaging devices of group B will bear the same reference characters with the small letter "a" affixed thereto, in order to avoid repetitive description. Also, although each of the article-engaging devices disclosed herein is constructed to accommodate a row including a plurality of articles; that is, bottles in particular, it is contemplated that the principles of the present invention can also be applied for handling individual articles or bottles, without departing from the spirit of the invention.

Each of the article-engaging devices or units comprises an elongated channel-shaped support 150 whose opposite ends are penetrated by screws 151, 152. As shown in FIGURE 12, the heads of the screws 151, 152 are preferably relatively large so as to fit between the flanges of the support 150 and prevent rotation of the screws 151, 152. It will be observed in FIGURE 6 that the screws 151, 152 loosely extend through the respective adjustment slots 104, 105 and 105a, 104a and each has a washer 153 and a nut 154 thereon for securing the supports 150 to the corresponding bars 102, 103 and 103a, 102a. It is thus seen that the article-engaging devices may be adjusted forwardly and rearwardly and relative to each other on the carrier head 20.

Each channel-shaped support 150 has four resilient gripper-element-suspension members 155, 156, 157, 158 suitably secured thereto adjacent opposite ends thereof. The suspension members 155—158 are preferably made from rubber or a similar substance. However, any substance, including metal, which is bendable, but tends to return to its original configuration when in a relaxed state, may serve as the suspenson members 155—158. For purposes of explanation only, the suspension members 155—158 will be referred hereinafter as being made from rubber.

As shown in FIGURE 12, the suspension members 155—158 are suitably secured to the flanges of the channel-shaped support 150, and said flanges extend downwardly from the body or web of the support 150 in converging relationship so the suspension members 155—158 extend downwardly in angular relationship to the vertical path of travel of the carrier head 20. It is apparent that the support 150 need not necessarily be channel-shaped, since the upper ends of the suspension members 155—158 may be so formed as to be secured to a flat bar at their upper ends while being maintained in angular relationship when in the relaxed state.

It will be noted that the suspension members 155, 156 extend downwardly from the support 150 in diverging relation to the respective suspension members 157, 158 and the upper portions of gripper members or elements 161, 162 are suitably secured to the respective pairs of suspension members 155, 156 and 157, 158, as by rivets 163. The gripper elements 161, 162 are each in the form of an elongated plate which is preferably made from a flexible material such as spring steel. Each of the gripper elements is provided with a plurality of spaced slots 165 in its lower portion which slots form a plurality of flexible fingers 166 on each of the gripper elements 161, 162. The lower edge of each finger 166 is provided with an inwardly projecting ridge or ledge 167 thereon which is adapted to engage a corresponding article or bottle 26 beneath a shoulder or flange 26a (FIGURES 7 through 11) such as is usually present on bottles, canned goods and the like. The ledges 167 also form smoothly rounded lower edges on the gripper elements 161, 162.

It will be noted that the angular relationship of the suspension members 155—158 causes the gripper elements 161, 162 to normally occupy an outwardly flared attitude at their lower portions so the fingers 166 and the ridges 167 of the gripper elements 161, 162 are normally spaced a substantially greater distance apart than the width or diameter of the upper portions of the articles to be engaged thereby. Thus, in order to grip articles therebetween, means are provided for moving the gripper elements into light gripping engagement with the articles as shown in FIGURES 3 and 11. In this instance, the outer surfaces of the gripper elements 161, 162 are adapted to be engaged by flexible fingers 170 on clamping members or flanges 172 of a channel-shaped clamping body 173. The clamping body 173 also includes a web 174, from opposite side edges of which the flanges 172 extend downwardly in converging relationship. Here again, each of the flanges 172 is provided with a plurality of slots 175 in its lower portion to form the clamping fingers 170.

The clamping fingers 170 are preferably flared outwardly at their lower portions, as at 176. It will be observed in FIGURES 1, 2, 3, and 6 through 11 that the web 174 of the clamping body 173 is disposed between the support 150 and the gripper elements 161, 162. Thus, openings 177 are provided between opposite ends of the flanges 172, or in opposite ends of the web 174, so as to clear the suspension members 155—158. It is apparent that the clamping body 173 is shown above the support 150 in FIGURE 12 merely for the purpose of clearly illustrating the connections between the support 150 and the gripper elements 161, 162 and to also illustrate the angular relationship of the suspension members 155—158.

It will also be observed in FIGURE 12 that the web portion of the channel-shaped support 150 is provided with three small openings 180, 181, 182 therein through which a piston rod or plunger 183 and a pair of longitudinally spaced guide posts 184, 185 loosely extend when the article-engaging device is assembled as shown in FIGURE 1, for example. The lower ends of the piston rod 183 and the guide posts 184, 185 are suitably secured to the web 174 of the clamping body 173. The lower portion of each of the guide posts 184, 185 has a spacing sleeve 186 thereon which is preferably made from a resilient material, such as rubber or the like, and which serves to limit movement of the clamping body 173 by engaging the lower surface of the web of the support 150.

The piston or plunger 183 is a part of a motive means for raising and lowering the corresponding clamping body 173 relative to the gripper elements 161, 162. In this instance, the plunger 183 is fluid-pressure-operated. To this end, the plunger 183 extends upwardly through the support 150 and into a closed double-acting cylinder 190, and is connected to a piston 191 mounted for vertical movement in the cylinder 190. The lower end of each cylinder 190 is suitably secured, as by welding, to the web portion of the corresponding support 150 (FIGURE 1).

Conduits 192, 193 are connected to the respective lower and upper portions of each cylinder 190, and it will be observed in FIGURES 1, 4 and 6 that the conduits 192, 192a extend from the lower ends of the cylinders 190, 190a of the respective groups of article-engaging devices A, B to a common manifold 194. The conduits 193, 193a extend from the upper ends of the respective cylinders 190, 190a to a manifold 195. It will be observed in FIGURES 4 and 5 that the manifolds 194, 195 are interconnected by means of a plate 196.

The front end of the upper manifold 195 is suitably secured to the bracket 107, as by welding, and the rear end of the lower manifold 194 is suitably secured to an angle bracket 197 which is, in turn, suitably secured to the elongated rear frame member 101 of the carrier head 20. It will be observed in FIGURES 1, 5 and 6 that the manifolds 194, 195 have respective conduits 200, 201 connected thereto, which extend to means for controlling the flow of fluid therethrough, to be presently described.

It will be observed in FIGURE 1 that the conduit 200, which is preferably at least partially flexible, extends upwardly and is connected to a junction box 205, where it communicates with a conduit 206. The junction box 205 may be suitably supported by the horizontal frame member 35 of the secondary carriage 22. The conduit 201 extends upwardly in FIGURE 1 and is connected to one side of a pressure responsive switch 207, which may be of conventional construction, and the function of which will be later described.

The other side of the pressure responsive switch 207 has a conduit 210 leading therefrom to one side of a fluid-pressure-operated time-delay-relay 211, which may also be of conventional construction, and to the other side of which a conduit 212 is connected. The conduit 212 leads to the junction box 205 for communication with a conduit 213.

It will be observed in FIGURE 2 that the conduits 206 and 213 extend upwardly from the junction box 205 and are connected to opposite sides of a four-way valve 215 mounted on member 30 of the primary carriage 21. A fluid pressure line or conduit 216 is also connected to valve 215. The conduit 216 leads from a suitable source of compressed air or other fluid pressure, not shown. The four-way valve 215 is provided with a rotary disk 217 thereon which, when in the position shown in FIGURE 2, directs fluid pressure from the conduit 216 through the conduit 206 while exhausting pressure from the conduit 213. When the valve disk 217 is rotated approximately one-fourth of a revolution in a clockwise direction in FIGURE 2, fluid pressure then flows from the conduit 216 through the conduit 213 and is exhausted from conduit 206.

The four-way valve 215 is of the same type and functions in the same manner as that disclosed in said copending application; that is, with each downward stroke of the primary carriage 21, an abutment 220, projecting inwardly from the disk 217 engages a stop element 221 carried by the lower front horizontal frame member 35 of the secondary carriage 22. Since the stop element 221 is stationary, downward movement of the four-way valve 215, with the carriage 21, relative to the stop element 221, causes the valve controlling disk 217 to rotate one-fourth of a revolution in a clockwise direction (FIGURE 2) to reverse the direction of the flow of the fluid pressure.

The disk 217 also has an abutment 225 projecting outwardly therefrom which is circularly spaced from the abutment 220. As will be later described, when the abutment 220 engages the stop element 221 (FIGURE 2), this ultimately causes compressed air to enter the lower end of the main cylinder 75 to impart upward movement to the primary carriage 21. As the primary carriage 21 moves upwardly, the abutment 225 engages and momentarily actuates an electrical switch 226 (FIGURE 3) supported on an arm 227 carried by the corresponding inverted U-shaped frame 83.

The switch 226 then functions in a manner fully disclosed in said copending application to effect sufficient rotation of the shaft 71 to impart a rearward stroke and then a forward stroke to the primary and secondary carriages 21, 22. Since the particular means for effecting such movement of the carriages 21, 22 does not form part of the present invention, a detailed description thereof is deemed unnecessary.

It has already been described how the carriages 21, 22 move rearwardly with the follower means 80 in engagement with the lower surfaces of the respective tracks 82. Now, as the carriages approach the position shown in FIGURE 3, as they move from left to right or rearwardly, the abutment 225 engages a second stationary stop element 230 (FIGURE 3) which is also adjustably secured to an arm or bracket 231 depending from the corresponding inverted substantially U-shaped frame 83. In so doing, the stop element 230 causes the valve controlling disk 217 to return to the position in FIGURE 2 and to cause fluid pressure to then flow from the inlet conduit 216 through the conduit 206.

As will be later described, this reverses the flow of fluid pressure to the cylinders 190, 190a of the groups of article engaging devices A, B to release the articles therefrom substantially as the follower means 80 moves beyond the rear ends of the corresponding downwardly inclined portions 85 of the tracks 82. Thus, fluid pressure in the cylinder 75 acts upon piston rod 76 (FIGURE 13) to cause the primary carriage 21 to dart upwardly, whereupon a forward stroke (right to left in FIGURE 3) is imparted to the carriages 21, 22. As the follower means 80 (FIGURE 3) moves from right to left above the corresponding track 82, it engages and swings the keeper element 81 forwardly or in a clockwise direction and, in so doing, actuates a switch 235 which, by means fully disclosed in said copending application, introduces fluid pressure to the upper end of the cylinder 75 to effect downward movement of the primary carriage 21 relative to the secondary carriage 22.

The method of operation of the improved article-engaging devices as effected in conjunction with movements of the carriages 21, 22 will now be described.

For purposes of description, it will be assumed that the primary carriage 21 is in the course of a downward stroke at the initiation of a cycle and that the parts occupy the position shown in FIGURE 2. It follows, therefore, that compressed air or fluid pressure is flowing into the upper end of the main cylinder 75 and is also present in the conduit 216, the four-way valve 215, the conduit 206, junction box 205, conduit 200 (FIGURE 1), manifold 194, conduits 192 and 192a and the lower ends of the respective cylinders 190, 190a, so the clamping bodies 173, 173a are held in raised or inoperative position relative to the gripper elements 161, 162, as shown in FIGURES 1, 2 and 7. It is to be assumed that a row of bottles or other articles 26 is properly alined beneath each of the sets of article-engaging members or gripper elements 161, 162.

Now, as the gripper elements 161, 162 move downwardly astraddle the upper ends of the corresponding rows of articles 26, the abutment 220 on the inner surface of disk 217 of the four-way valve 215 engages the valve actuating member or stop element 221 to rotate the disk 217 in the manner heretofore described and thereby establish communication between the air inlet conduit 216 and the conduit 213. This permits compressed air or fluid pressure to flow into the time-delay-relay 211, which momentarily delays further flow of fluid pressure therebeyond to insure that any articles which may be misalined relative to the gripper elements 161, 162 may be moved into proper alinement with the corresponding gripper elements 161, 162 as will be more fully described hereinafter.

Thereafter, the time-delay-relay 211 permits compressed air or fluid pressure to continue through the conduits 210, the pressure switch 207, the conduit 201, the manifold 195, and through the conduits 193, 193a to the upper ends of the respective cylinders 190, 190a. It is apparent that the piston rods or plungers 183 then impart downward movement to the clamping bodies 173 so the fingers 170 thereof (whose lower portions are spaced closer together than the normal displacement between the distal surfaces of the gripper fingers 166 of the two gripper elements 161, 162) engage the gripper elements, as shown in FIGURES 3 and 11, to move the same inwardly into yielding engagement with the corresponding articles 26.

The fingers 170 and 166 of the clamping bodies 173 and the gripper elements 161, 162 are sufficiently flexible so that, even though the ridges or ledges 167 engage the articles beneath the flanges 26a thereof (FIGURE 11) the gripper elements 161, 162 will not exert sufficient pressure against opposite sides of the article to break the same in the event the articles are made from glass or other easily fractured material. Also, in the event of any one of the bottles or articles 26 being held too tightly within the confines of the case or container 27 (FIGURE 7), the corresponding fingers 166 of the gripper elements 161, 162 may easily yield and spread apart from each other sufficiently to permit the ledges 167 thereon to move upwardly and free of the corresponding article. On the other hand, the remaining articles held in the corresponding gripper elements 161, 162 by the gripper fingers 166 are moved upwardly.

In the particular arrangement shown herein, it is desirable that the pressure in the cylinders 190, 190a be built up to a predetermined amount before an upward stroke is imparted to the primary carriage, to thereby insure that the articles 26 are properly grasped by the fingers 166 of the corresponding gripper elements 161, 162. To insure this build-up of pressure, and to also insure that the position of the clamping fingers 170 relative to the fingers 166 of the article-engaging elements 161, 162 may be accurately determined, it will be observed in FIGURES 2 and 3 that each of the guide posts 184, 185 has an adjustable stop collar or limiting collar 240 thereon. The limiting collar 240 also serves as a bumper and is, therefore, preferably made from a resilient material such as rubber, leather or the like. Each of the collars 240 is maintained in the desired adjusted position above the corresponding support 150, when the clamping elements or fingers 170 are in elevated position, by means of a collar 241 adjustably secured on the corresponding post 184, 185.

It is apparent that relative light pressure would normally be required in order to impart downward movement to the clamping bodies 173, and the pressure responsive switch 207 may be of a type which will effect an electrical circuit only upon a predetermined amount of pressure existing in the conduits 201, 210. It is also apparent that the pressure in the conduits 201, 210 will increase quite rapidly upon engagement of the bumpers or collars 240 with the upper surfaces of the corresponding supports 150. In this instance, when the fluid in the conduits 201, 210 reaches a predetermined pressure, the pressure-responsive switch closes a circuit to one side of a main cylinder control unit generally designated at 243, and which is shown schematically in FIGURE 2.

The cylinder control unit 243 may be identical to the cylinder control unit indicated at 394 in FIGURES 21 and 24 of said copending application and, therefore, a detailed description thereof is deemed unnecessary. Upon completion of the circuit to the cylinder control unit 243 in FIGURE 2 of the present drawings, fluid pressure is introducel into the lower end of the main cylinder 75 to impart upward movement to the primary carriage 21 and to thereby raise the carrier head 20, the groups of article-engaging devices A, B and the corresponding rows of articles 26 therewith.

It has already been described that the primary carriage 21 then moves upwardly and then both of the carriages 21, 22 move rearwardly to occupy the position shown in FIGURE 3, at which time, the disk 217 of the four-way valve 215 is rotated in a counter-clockwise direction in FIGURE 3 to permit fluid pressure to enter the lower ends of the cylinders 190, 190a of the groups of article-engaging devices A, B. In so doing, the piston rods or plungers 183 move upwardly to raise the clamping bodies 173 to inoperative position; that is, out of engagement with the fingers 166 of the corresponding gripper elements 161, 162. As heretofore stated, each follower means 80 then moves beyond the rear end of the downwardly and rearwardly inclined portion 85 of the corresponding track 82, and the groups of article-engaging devices A, B then dart upwardly free of the articles 26, thus releasing the same onto the conveyor 24. This completes a cycle in the operation of the article-engaging devices, it having already been described how the primary carriage 21 is then returned to the position at which the cycle originated.

Due to the fact that it quite frequently happens that one or more of the articles or bottles 26 in a row or several rows may not be accurately alined with the sets of article gripper elements 161, 162, an important feature of the present invention resides in the manner which the gripper elements 161, 162 are suspended from the corresponding supports 150 so as to automatically aline any articles therewith which may be misalined during the course of a downward stroke of the corresponding set of gripper elements 161, 162.

As heretofore stated, the suspension members 155—158 are made from a flexible material which tends to return to its original configuration, but which may easily be bent or distorted. Referring to FIGURES 7 through 11, the manner in which a bottle 26, for example, is alined with a corresponding set of gripper elements 161, 162 is shown. In FIGURE 7, the article-engaging device is in the course of a downward stroke, and the upper end of the bottle 26 is considerably to one side of the median center of the set of gripper elements 161, 162. Thus, it will be observed in FIGURE 8 that the gripper element 161 engages the upper end of the bottle 26 and, since the gripper elements 161, 162 extend in diverging relationship to the mean center of the article-engaging device and to the path of travel of the same, the suspension member 155 and its corresponding member 156 (FIGURE 12) are distorted and bend in the same direction in which the corresponding gripper element 161 is inclined.

In so doing, this tends to urged the gripper element 161 outwardly as it slides in engagement with the upper end of the corresponding bottle 26 until, as shown in FIGURE 10, the gripper element slides off the upper edge of the bottle 26 and then moves downwardly past the upper end of the bottle to move the bottle inwardly as the gripper element springs inwardly to occupy its normal attitude. Thereupon, since the engagement of either of the gripper elements 161 or 162 with the upper end of an article does not retard downward movement of the article-engaging device, the gripper elements 161, 162 will have reached lowermost position and, as heretofore stated, upon the time delay relay 211 permitting compressed air to enter the upper ends of the corresponding cylinders, the clamping flanges 172 move downwardly in engagement with and relative to the gripper elements 161, 162 to clamp the upper end of the corresponding bottles between the gripper elements 161, 162. It is apparent that the gripper element 162 would also aline any misalined articles between the gripper elements in the same manner as that described with respect to the gripper element 161.

It is thus seen that I have provided a novel article transferring apparatus utilizing flexible gripper elements and clamping members which will take a considerable amount of abuse without becoming worn or damaged in any way through an extremely extended period of use, and which are so arranged as to operate in conjunction with the associated machine to insure operation of the article transferring apparatus in predetermined sequence and insure that the article gripper elements are in proper engagement with the articles before being clamped and before being lifted by the carrier head and associated carriage. This apparatus further insures that the clamping members are moved out of clamping engagement with the gripper elements in proper timed relationship to release the article from the gripper elements immediately prior to upward movement of the carrier head and the primary carriage, upon the articles being transferred from the platform 25 to the conveyor 24, for example.

In the drawings and specification there has been set forth a preferred embodiment of the invention and, although specific terms are employed, they are used in a generic and descriptive sense only and not for the purposes of limitation, the scope of the invention being defined in the claims.

I claim:

1. An article-engaging device comprising a pair of gripper elements, a rigid support, bendable flexible members suspending each gripper element from the support and holding the elements in downwardly and outwardly inclined relationship, and means to move said elements inwardly into clamping engagement with an article therebetween, said means comprising a substantially channel-shaped body including opposed flanges and a connecting web therebetween, said web being interposed between the gripper elements and said support and said flanges being disposed outwardly of said gripper elements, a plunger connected to said web, and means to impart axial movement to said plunger; said flanges being movable into straddling engagement with the distal surfaces of said gripper elements in response to downward axial movement of said plunger to effect inward movement of said elements for gripping an article therebetween.

2. In a machine for handling bottles having an operating head and being adapted to normally occupy a position spaced above at least one row of bottles, and means for lowering, raising, moving to one side and then returning said head to normal position; the combination of at least one pair of plate-like gripper elements resiliently suspended from said head and normally occupying open position with respect to the bottles, a pair of clamping members normally spaced above at least the lower portions of the gripper elements and being spaced apart a distance less than that normally spanned by the gripper elements, means operable automatically upon downward movement of the head and the gripper elements astraddle corresponding bottles for imparting downward movement to the clamping members relatively to the gripper elements whereby the clamping members move the gripper elements inwardly into bottle grasping position and whereby said bottles are elevated with the head as it subsequently moves upwardly and are then moved to one side with the head, said automatically operable means also being operable to move upwardly relative to the gripper elements as said head moves to said one side to thereby release the gripper elements and, in turn, release the bottles from the gripper elements.

3. In a machine for handling bottles having an operating head adapted to normally occupy a position spaced above at least one row of bottles, and means for lowering, raising, moving to one side and then returning said head to normal position; the combination of at least one pair of plate-like gripper elements resiliently suspended from said head and normally occupying open position with respect to the bottles, a pair of fluid-pressure-operated clamping members normally spaced above at least the lower portions of the gripper elements and being spaced apart a distance less than that normally spanned by the lower edges of the gripper elements, means operable automatically upon downward movement of the head and the gripper elements astraddle corresponding bottles for imparting downward movement to the clamping members relatively to the gripper elements whereby the clamping members move the gripper elements inwardly into bottle grasping position and whereby said bottles are elevated with the head as it subsequently moves upwardly and are then moved to one side with the head, said automatically operable means also being operable to move the clamping members upwardly relative to the gripper elements as said head moves to said one side to thereby release the gripper elements and, in turn, release the bottles from the gripper elements.

4. In an article handling machine having a main frame, a vertically movable carriage on the frame, means for lowering and raising the carriage, and means limiting the strokes of said carriage; the combination of a second frame, brackets on the second frame and having bayonet slots therein, screws depending from the carriage and penetrating said slots, spaced nuts on each screw adapted to engage upper and lower surfaces of the respective brackets, removable spacer means on each screw between the upper nut and the respective bracket, at least one pair of normally biased-apart gripper elements suspended from said second frame, a pair of spaced-apart relatively rigid clamping members normally spaced above at least the lower portions of the gripper elements, means to move the clamping members downwardly astride and in engagement with the gripper elements when the gripper elements occupy article-engaging position for moving the gripper elements inwardly toward each other and for gripping at least one article therebetween, said last-named means being operable to raise said clamping members relative to the gripper elements whereby said gripper elements return to normal biased-apart position for releasing any article therebetween, and removal of the spacer means serving to facilitate upward adjustment of the second frame relative to the carriage.

5. In an article transferring apparatus, the combination of a movable frame, a plurality of article-engaging devices, each of said article-engaging devices including a pair of relatively thin and flexible gripper elements extending downwardly and outwardly in diverging relationship, a pair of spaced flexible suspension members connected to upper portions of each gripper element and having their upper portions attached to said frame, whereby each of said gripper elements is independently and freely shiftable relative to said frame to automatically compensate for misalinement with an article to be engaged therebetween, and movable means engageable with the distal surfaces of said gripper elements for moving the same into article gripping position for gripping an article therebetween, said last-mentioned means comprising a substantially channel-shaped body including opposed flanges and a connecting web therebetween, said web being guided for movement toward and away from the gripper elements between the gripper elements and the frame, at least one plunger connected to said web and extending toward said frame, and means to impart axial movement to said plunger toward and away from the gripper elements for respectively moving said flanges into and out of operative engagement with the distal surfaces of said gripper elements.

6. A structure according to claim 5 in which said plunger is fluid-pressure-actuated.

7. A structure according to claim 5 wherein said means for imparting movement to said plunger comprises a fluid pressure cylinder carried by said frame, a piston in the cylinder and to which the upper end of said plunger is connected, and means for alternately admitting fluid pressure into opposite ends of the cylinder.

8. A structure according to claim 5 including means for adjustably limiting the extent of movement of said channel-shaped body relative to the respective gripper elements.

9. In an article handling machine having a carriage and means for lowering and raising the carriage; the combination of at least one pair of normally spaced-apart gripper elements, a pair of relatively stiff and bendable suspension members for each of said gripper elements and suspending said gripper elements from said carriage, said suspension members being bendable under compression effected therein by engagement of the corresponding gripper elements with an obstruction in the course of downward movement of the carriage, whereby the corresponding gripper element may be deflected out of its normal vertical path upon engagement with the upper end of an article to thus slide outwardly on the upper end of the article, to move beside the article, and move the same into alinement between the pair of gripper elements, a pair of spaced-apart relatively rigid and flexible clamping members normally spaced above at least the lower portions of the gripper elements, means to move the clamping members downwardly astride and in engagement with the gripper elements when the gripper elements occupy article-engaging position for moving the gripper elements inwardly toward each other and for gripping at least one article therebetween, and said last-named means being operable to raise said clamping members relative to the gripper elements, whereby said gripper elements may move outwardly with respect to each other to return to normal position for releasing any article therebetween.

10. In an article transferring apparatus, the combination of a substantially vertically movable frame, at least one article-engaging device including a pair of relatively thin and flexible gripper elements extending downwardly and outwardly in diverging relationship, at least one flexible suspension member connected to an upper portion of each gripper element and having its upper portion attached to said frame whereby each of said gripper elements is independently and freely shiftable relative to said frame to automatically compensate for misalinement with an article to be engaged therebetween, and movable means engageable with the distal surfaces of said gripper elements for moving the same into article gripping position for gripping an article therebetween, said means comprising a substantially channel-shaped body including opposed flanges and a connecting web therebetween, said web extending between the gripper elements and the frame, said flanges being adapted to straddle said gripper elements, at least one plunger connected to said web and extending toward said frame, and means to impart axial movement to said plunger toward and away from the gripper elements for respectively moving said flanges into and out of operative engagement with the distal surfaces of said gripper elements.

11. A structure according to claim 10 in which said plunger is fluid-pressure-actuated.

12. A structure according to claim 10 wherein said means for imparting movement to said plunger comprises a fluid pressure cylinder carried by said frame, a piston in the cylinder and to which the upper end of said plunger is connected, and means for alternately admitting fluid pressure into opposite ends of the cylinder.

13. A structure according to claim 10 including means for adjustably limiting the extent of movement of said channel-shaped body in either direction relative to said gripper elements.

14. An article-grasping device comprising a pair of spaced gripper elements, each of said gripper elements being in the form of an elongated flexible plate, means to move said plates to positions adjacent opposite sides of an article, a substantially channel-shaped body including opposed flanges and a connecting web therebetween, said web being disposed atop said plates and said flanges being disposed outwardly of the distal surfaces of said plates, and means to impart movement to said channel-shaped body, said flanges being movable into straddling engagement with the distal surfaces of said plates in response to downward movement of said channel-shaped body to effect inward movement of said plates toward each other for gripping the article therebetween.

15. An article-grasping device comprising a pair of spaced-apart elongated flexible gripper elements, a support disposed above said gripper elements, means suspendingly connecting said gripper elements to said support for independent shiftable movement of said gripper elements relative to said support to automatically compensate for misalinement with an article to be engaged between said gripper elements, said connecting means comprising spaced first and second pairs of flexible resilient suspension members attached to said support, the two suspension members comprising each of said first and second pairs extending downwardly from said support in partially overlying crisscross relationship and being connected to upper portions of each of said gripper elements respectively, and each of said suspension members being bendable in response to the engagement of the gripper element connected thereto with an obstruction upon downward movement being imparted to the gripper elements to deflect the gripper element connected thereto out of its normal vertical path, whereby the engagement of a gripper element with the upper end of an article causes the gripper element to slide outwardly on the upper end of the article, to move beside the article, and move the article into alinement between the pair of gripper elements, and movable means engageable with the distal surfaces of said gripper elements for moving said gripper elements inwardly toward each other into article gripping position to grip an article therebetween.

References Cited in the file of this patent

UNITED STATES PATENTS

| | | |
|---|---|---|
| 346,116 | Malley | July 27, 1886 |
| 614,935 | Conde | Nov. 29, 1898 |
| 1,330,524 | Freud | Feb. 10, 1920 |
| 2,177,595 | Freed | Oct. 24, 1939 |
| 2,487,040 | Bilodeau | Nov. 8, 1949 |
| 2,561,536 | Rowe | July 24, 1951 |
| 2,568,210 | Whitney | Sept. 18, 1951 |
| 2,805,095 | Cummings | Sept. 3, 1957 |